(12) United States Patent
Suda

(10) Patent No.: US 6,556,246 B1
(45) Date of Patent: *Apr. 29, 2003

(54) AUTOMATIC FOCUSING DEVICE

(75) Inventor: Hirofumi Suda, Kanagawa-ken (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/872,682

(22) Filed: Jun. 10, 1997

Related U.S. Application Data

(63) Continuation of application No. 08/319,271, filed on Oct. 6, 1994, now abandoned.

(30) Foreign Application Priority Data

Oct. 15, 1993 (JP) .............................................. 5-282026

(51) Int. Cl.$^7$ ......................... H04N 5/228; H04N 5/232
(52) U.S. Cl. ................... 348/352; 348/208.12; 348/354
(58) Field of Search ................................. 348/207, 208, 348/349, 350, 352, 353, 354, 208.99, 208.1, 208.4, 208.6, 208.12–208.16; 396/121, 123, 133; H04N 5/228, 5/232

(56) References Cited

U.S. PATENT DOCUMENTS

| | | | | |
|---|---|---|---|---|
| 5,101,230 A | * | 3/1992 | Shikaumi et al. ............. | 396/54 |
| 5,107,293 A | * | 4/1992 | Sekine et al. ................ | 348/208 |
| 5,115,262 A | * | 5/1992 | Komiya ........................ | 396/91 |
| 5,198,896 A | * | 3/1993 | Kondo et al. ................ | 358/105 |
| 5,204,749 A | * | 4/1993 | Toyama et al. .............. | 358/227 |
| 5,210,566 A | * | 5/1993 | Nishida ....................... | 396/123 |
| 5,223,934 A | * | 6/1993 | Hong ........................... | 348/25 |
| 5,321,515 A | * | 6/1994 | Kusaka et al. .............. | 348/208 |
| 5,365,302 A | * | 11/1994 | Kodama ...................... | 396/121 |
| 5,371,539 A | * | 12/1994 | Okino et al. ................. | 348/207 |
| 5,396,286 A | * | 3/1995 | Ishizuka ...................... | 348/208 |
| 5,402,174 A | * | 3/1995 | Takahashi .................... | 348/347 |
| 5,422,673 A | * | 6/1995 | Kondo ......................... | 348/352 |
| 5,446,494 A | * | 8/1995 | Ueda et al. .................. | 348/349 |
| 5,627,586 A | * | 5/1997 | Yamasaki .................... | 348/169 |
| 5,734,933 A | * | 3/1998 | Sekine ......................... | 348/208 |

OTHER PUBLICATIONS

Vomori et al., Automatic Image Stabilizing System by Full–Digital Signal Processing, Aug. 1990, IEEE Trans. on Consumer Electronics, pp. 510–519.*

* cited by examiner

Primary Examiner—Ngoc-Yen Vu
(74) Attorney, Agent, or Firm—Robin, Blecker & Daley

(57) ABSTRACT

An automatic focusing device includes a motion vector detecting circuit which detects from a picked-up image signal a movement of a picked-up image within an image plane, a filter which extracts a signal of a predetermined frequency component from the picked-up image signal, a gate circuit which takes out from the signal extracted by the filter a signal corresponding to a focus detecting area in the image plane, an area setting circuit which corrects the position of the focus detecting area by controlling the gate circuit on the basis of a detection output of the motion vector detecting circuit, and a driving part which moves a focusing lens to an in-focus position according to the signal extracted by the gate circuit.

15 Claims, 4 Drawing Sheets

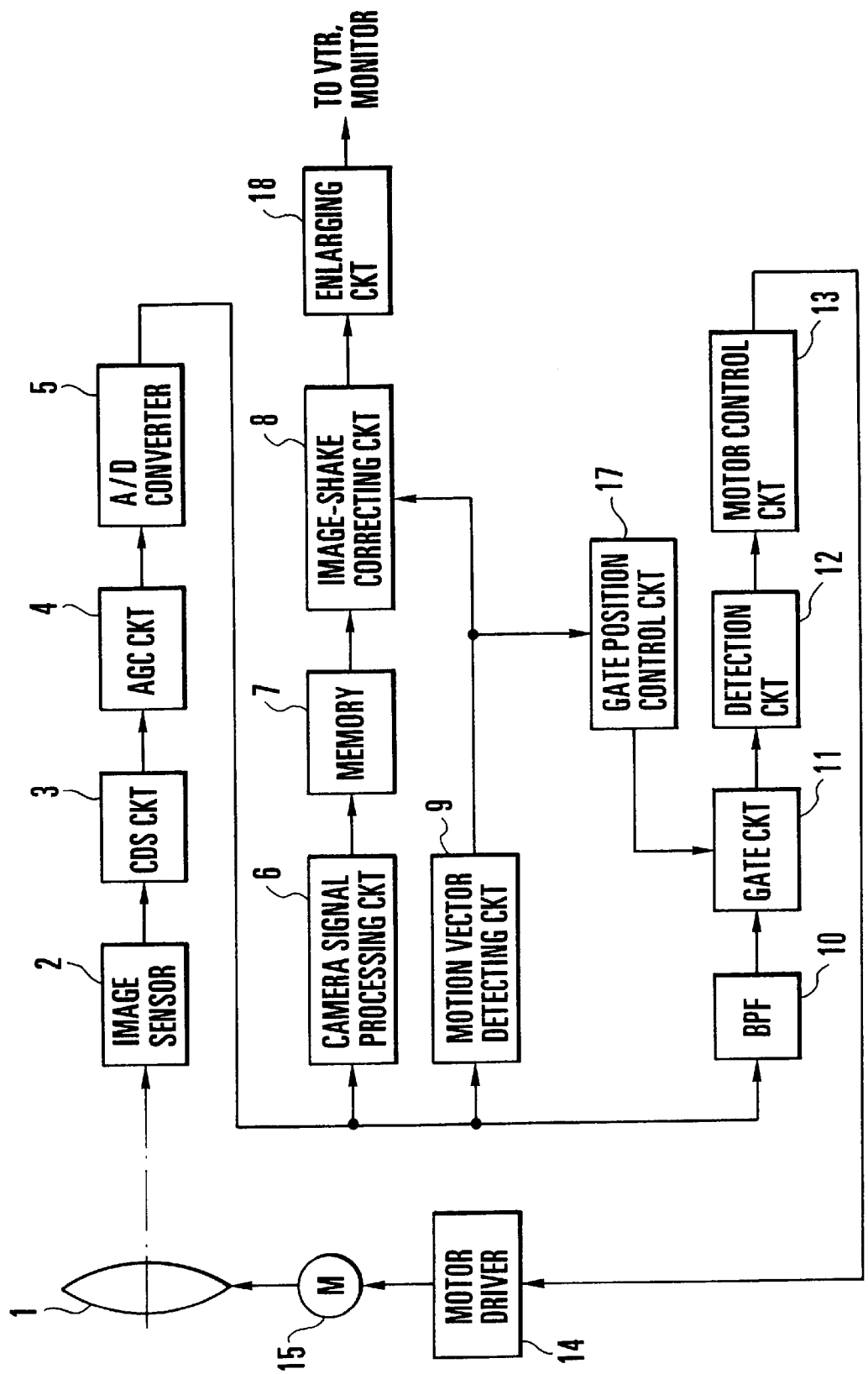

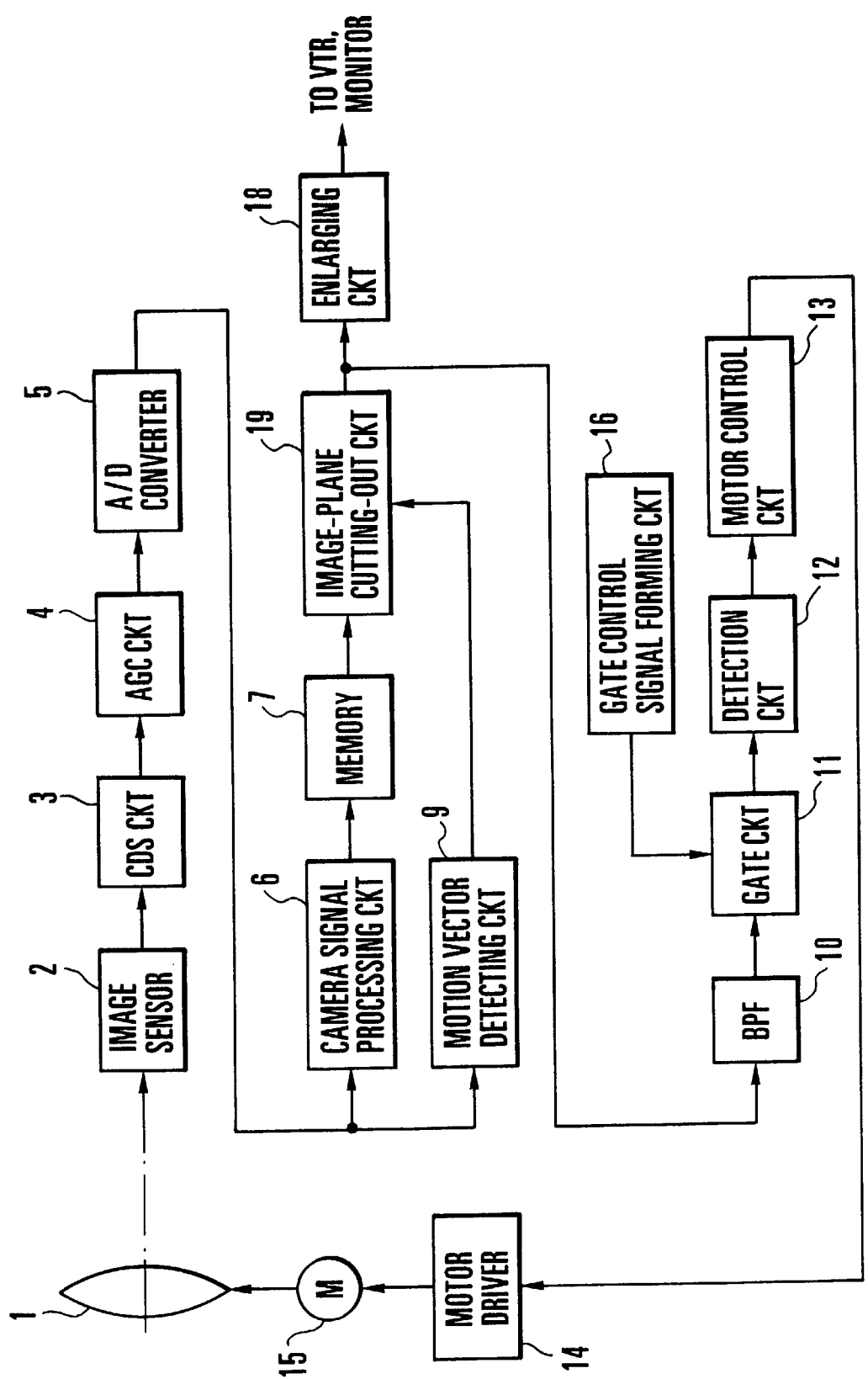

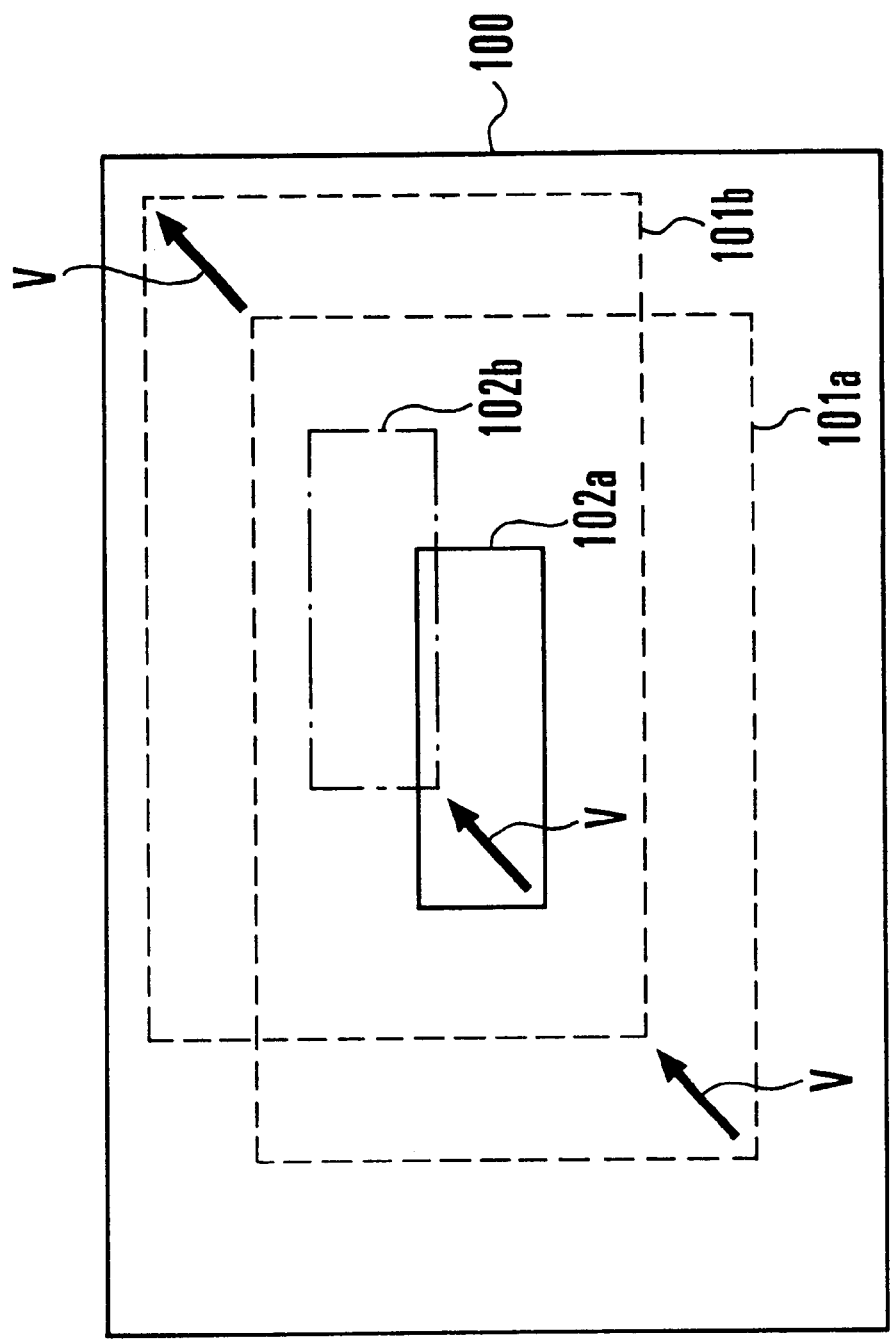

AUTOMATIC FOCUSING DEVICE

This is a continuation application under 37 CFR 1.62 of prior application Ser. No. 08/319,271 filed on Oct. 6, 1994 now (abandoned).

BACKGROUND OF THE INVENTION

1. Field of the Invention

This invention relates to an automatic focusing device and more particularly to an automatic focusing device adapted for a video camera.

2. Description of the Related Art

The known automatic focusing devices for image pickup apparatuses such as video cameras or the like include an automatic focusing device of a so-called hill-climbing type. The hill-climbing type automatic focusing device is arranged to carry out focusing in the following manner. A signal representing a high frequency component is extracted out of a video signal obtained from an image sensor which is a CCD or the like. A focusing lens is driven to move in such a way as to bring the level of this signal of high frequency component to a maximum level. The automatic focusing device of this type obviates the necessity of any additional optical member otherwise to be used in focusing and is capable of accurately focusing on an object of shooting located at any distance irrespective as to whether the distance is far or near.

FIG. 1 shows in a block diagram the arrangement of the automatic focusing device of the above-stated kind. Referring to FIG. 1, a focusing lens 1 is arranged to be movable in the direction of an optical axis. An optical image of an object of shooting coming through the focusing lens is formed on a pickup image plane of an image sensor 2. The image sensor 2 which is a CCD or the like is arranged in the rear of the focusing lens 1 to photo-electrically convert the optical image into a video signal. A sample-and-hold circuit (hereinafter referred to as a CDS circuit) 3 is connected to the image sensor 2 and is arranged to sample and hold the video signal coming from the image sensor 2. An automatic gain control (hereinafter referred to as AGC) circuit 4 is connected to the CDS circuit 3 and is arranged to control and bring to a predetermined level the gain of the video signal which is sampled and held by the CDS circuit 3. An analog-to-digital (hereinafter referred to as A/D) converter 5 is connected to the AGC circuit 4 and is arranged to convert the video signal from an analog form into a digital video signal. To the A/D converter 5 is connected a camera signal processing circuit 6 which is arranged to convert the digital video signal into a standard TV signal. A band-pass filter (hereinafter referred to as BPF) 10 which is arranged to extract a high frequency component of the digital video signal is also connected to the A/D converter 5. The high frequency component varies with the state of focus within the video signal.

To the BPF 10 is connected a gate circuit 11. The gate circuit 11 is arranged to pass a portion of the high frequency video signal which comes from the BPF 10 and corresponds to a focus detecting area of the image plane, in accordance with a gate control signal obtained from a gate control signal forming circuit 16. To the gate circuit 11 is connected a detection circuit 12 which is arranged to hold the peak of the output of the gate circuit 11 at intervals synchronized with a period of time which is an integer times as long as a vertical synchronizing signal. To the detection circuit 12 is connected a motor control circuit 13 which is arranged to set the direction and the speed of a driving action of a motor 15. To the motor control circuit 13 is connected a motor driver 14, which is connected to the motor (M) 15. The motor 15 is arranged to drive the focusing lens 1.

The automatic focusing device arranged in this manner operates as follows. The focusing lens 1 forms an optical image of an object of shooting on the pickup image plane of the image sensor 2. The optical image is photo-electrically converted by the image sensor 2 into a video signal. The video signal which represents the object image is supplied to the CDS (sample-and-hold) circuit 3 to be sampled and held. The sampled-and-held video signal is supplied to the AGC circuit 4 to be amplified up to a predetermined level. The amplified video signal is converted by the A/D converter 5 into a digital video signal. The digital video signal is supplied to the camera signal processing circuit 6 to be converted into a standard TV signal. The standard TV signal is supplied to external circuits such as a video tape recorder (VTR) and a monitor or the like. The digital video signal is supplied also to the BPF 10. The BPF 10 extracts the high frequency component out of the video signal. The high frequency component extracted is supplied to the gate circuit 11. The gate circuit 11 operates, on the basis of the gate control signal obtained from the gate control signal forming circuit 16, to take out from the output of the BPF 10 only the high frequency component of a video signal portion which corresponds to the focus detecting area which is set within the image plane. The high frequency component of the video signal taken out from the gate circuit 11 is supplied to the detection circuit 12 to be peak-held at the intervals synchronized to a period of time which is an integer times as long as the period of the vertical synchronizing signal. As a result of the peak holding action, an automatic focusing (hereinafter referred to as AF) evaluating value signal is obtained.

The AF evaluating value signal is supplied to the motor control circuit 13. The motor control circuit 13 then sets the motor driving direction in which the AF evaluating signal increases. The motor control circuit 13 also sets the motor driving speed, i.e., a focusing speed, at a high speed in the event of a greatly blurred state of the object image and at a low speed in case of a slightly blurred state. The motor driver 14 then drives and controls the motor 15 in the direction and at the speed set by the motor control circuit 13. In accordance with the direction and the speed as set, the motor 15 causes the focusing lens 1 to move along its optical axis. The so-called hill-climbing type automatic focusing action is carried out in this manner.

In the conventional automatic focusing device described above, the gate circuit 11 is arranged to operate under the control of the gate control signal which is formed by the gate control signal forming circuit 16 to control and cause the gate circuit 11 to open and close in such a way as to pass only the signal that corresponds to the focus detecting area which is fixedly set beforehand within the image plane. As a result, only a portion of the high frequency component of the video signal coming from the BPF (band-pass filter) 10 that corresponds to the fixed focus detecting area is used for focus adjustment. Therefore, when the whole image plane is shaken by shaking of images, etc., the focus detecting area also shakes to cause an image obtained within the focus detecting area either to suddenly move or to move out of and into the focus detecting area or to cause some undesired image to come into the focus detecting area. In such a case, the value of the AF evaluating value signal abruptly changes to make the automatic focusing action unstable.

Image-shake correcting methods which have been developed for solving this problem of shaking of images include two methods. One is a method of correcting the shaking of images by moving the optical system on the basis of vibrations detected. The other is a method of correcting the picked-up image signal on the basis of the shake of images detected. The optical-system moving method has a merit in that the signal used for automatic focusing (AF) is also corrected but has a demerit in that the number of necessary parts increases to make the arrangement of the device more complex. The method of correcting the picked-up image signal on the basis of the shake of images detected, on the other hand, is not effective for correcting the unstableness of the automatic focusing action, because the correction by this method is generally made after the signal to be used for automatic focusing is taken out.

SUMMARY OF THE INVENTION

In view of the present state of the automatic focusing action described in the foregoing, it is an object of this invention to provide an automatic focusing device which prevents the automatic focusing action from becoming unstable due to shaking of images and is capable of stably focusing on a main object of shooting.

To attain this object, an automatic focusing device which is arranged according to this invention as a preferred embodiment thereof includes motion vector detecting means for detecting from a picked-up image signal outputted from image pickup means a movement of a picked-up image taking place within an image plane, filter means for extracting a signal of a predetermined frequency component from the picked-up image signal, gate means for taking out from the signal extracted by the filter means a signal corresponding to a focus detecting area in the image plane, area setting means for correcting the position of the focus detecting area by controlling the gate means on the basis of a detection output of the motion vector detecting means, and driving means for driving a focusing lens to move to an in-focus position on the basis of an output of the gate means.

To attain the same object, an automatic focusing device which is also arranged according to this invention as another preferred embodiment thereof includes motion vector detecting means for detecting from a picked-up image signal outputted from image pickup means a movement of a picked-up image taking place within an image plane, image-plane cutting-out means for varying a range of cutting out an image plane from the picked-up image signal on the basis of a detection output of the motion vector detecting means in such a way as to stabilize an image of an object of shooting, filter means for extracting from an output of the image-plane cutting-out means a signal of a predetermined frequency component, gate means for taking out from the signal extracted by the filter means a signal corresponding to a focus detecting area in the image plane, and driving means for driving a focusing lens to move to an in-focus position on the basis of an output of the gate means.

The embodiment which is arranged in the above-stated manner operates as follows. A movement of a picked-up image that takes place within an image plane is detected by the motion vector detecting means on the basis of, for example, a computing operation on a time-series correlation between images. The filter means extracts the signal of the predetermined frequency component from the picked-up image signal. The extracted frequency component signal is inputted to the gate means. The gate means then takes out the signal corresponding to the focus detecting area in the image plane from the signal extracted by the filter means. Then, the position of the focus detecting area is corrected on the basis of the detection output of the motion vector detecting means. The driving means drives the focusing lens to an in-focus position on the basis of the output of the gate means.

In the case of another embodiment, the motion vector detecting means detects a movement of the picked-up image taking place within the image plane on the basis of a computing operation on a time-series correlation between images. The image-plane cutting-out means acts, on the basis of the detection output of the motion vector detecting means, to vary the cutting-out position of the image plane to be cut out from the picked-up image signal. The image-plane cutting-out position is varied to correct the movement in such a way as to stabilize the object image. Further, the filter means extracts, from the output of the image-plane cutting-out means, the signal of the predetermined frequency component. The gate means then takes out, from the signal extracted by the filter means, a signal corresponding to the focus detecting area in the image plane. The driving means drives the focusing lens to move to an in-focus position on the basis of the output of the gate means.

The above and other objects and features of this invention will become apparent from the following detailed description of embodiments thereof taken in connection with the accompanying drawings.

BRIEF DESCRIPTION OF THE DRAWINGS

FIG. 2 is a block diagram showing the arrangement of a first embodiment of this invention.

FIG. 3 is a block diagram showing the arrangement of a second embodiment of this invention.

FIG. 4 shows a diagram for explaining an image-shake correcting process and a shifting action of a focus detecting area.

DETAILED DESCRIPTION OF THE PREFERRED EMBODIMENTS

Figure 1:
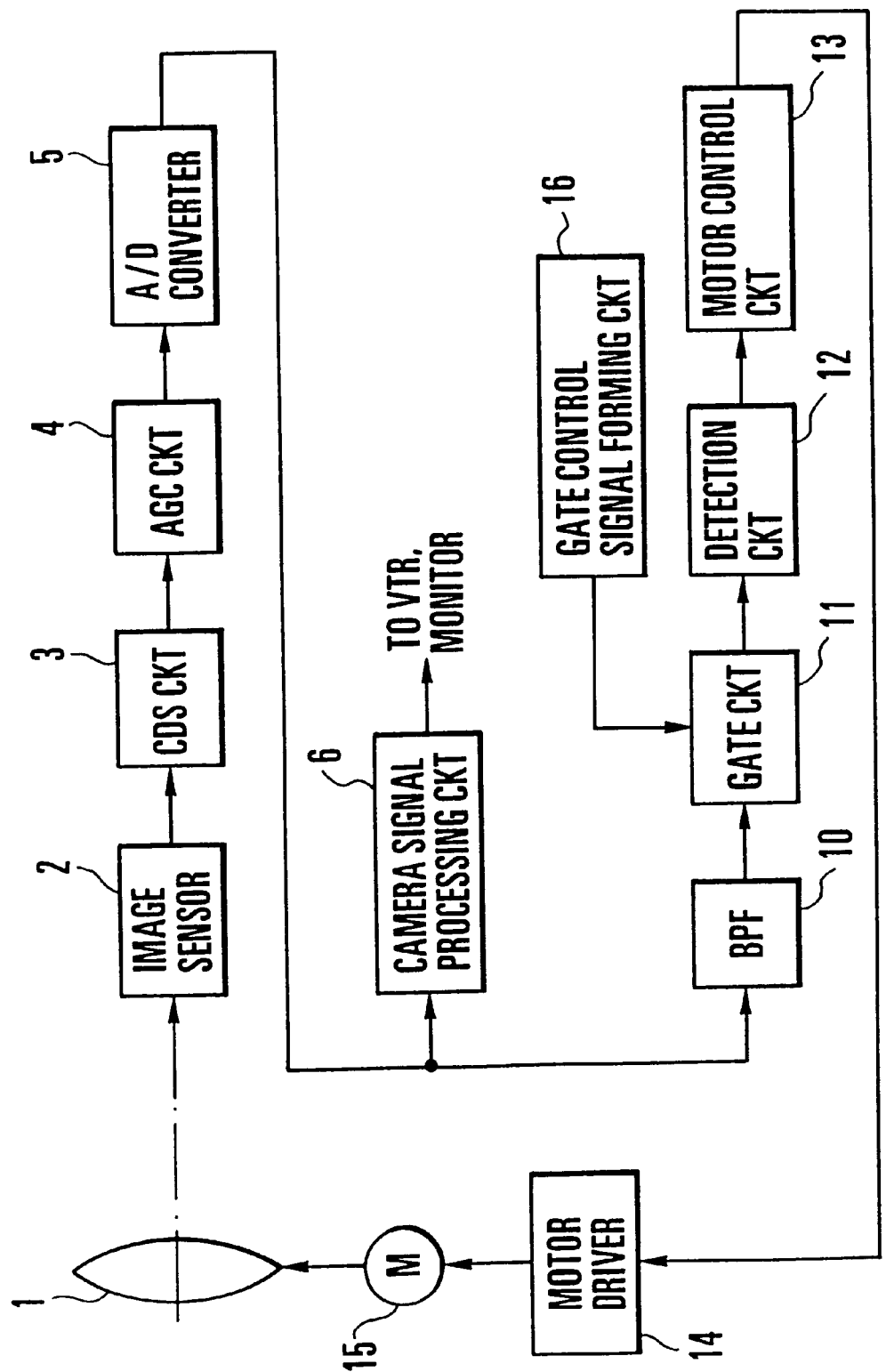
FIG. 1 is a block diagram showing the typical arrangement of the conventional automatic focusing device.

The details of this invention are described below through some of preferred embodiments thereof with reference to the accompanying drawings. FIG. 2 is a block diagram showing the arrangement of a first embodiment of this invention. FIG. 3 is a block diagram showing the arrangement of a second embodiment of this invention. FIG. 4 shows a diagram for explaining an image-shake correcting process and a shifting action of a focus detecting area.

First Embodiment

The first embodiment of this invention is first described with reference to FIG. 2. In FIG. 2, all the component parts that are the same as those shown in FIG. 1 are indicated by the same reference numerals and the details of them are omitted from the description.

In the case of this embodiment, a video signal outputted from an A/D converter 5 is supplied to a camera signal processing circuit 6 and also to a motion vector detecting circuit 9.

The motion vector detecting circuit 9 is arranged to detect a movement of an image appearing on an image plane by comparing the image appearing on one of image planes of a plurality of fields with the image appearing on another field image plane. The motion vector detecting circuit 9 then outputs the amount (speed) and the direction of the movement as a motion vector. More specifically, a change of the video signal taking place between the field image planes is detected at a plurality of positions within the image plane and a plurality of motion vectors showing the amount and the direction of the change are detected. An averaging or weight-attaching computing operation is performed on these motion vectors to obtain a representative motion vector which shows the movement of the whole image plane. The representative motion vector hereinafter will be referred to simply as a motion vector.

The output of the camera signal processing circuit 6 is connected to an image memory 7, which is arranged to store either one field amount or one frame amount of the video signal. The image memory 7 is connected to an image-shake correcting circuit 8, which is arranged to read out image information from the image memory 7 on the basis of the motion vector outputted from the motion vector detecting circuit 9 and to supply the image information to a circuit arranged subsequent to it. The image-shake correcting circuit 8 corrects shaking of the image by controlling the range of image information obtained within the image plane in such a way as to cancel the movement of the image.

More specifically, the image-shake correcting circuit 8 is arranged as follows: A range of the image information which is to be read out from the image memory 7 and supplied to a subsequent part is set to be smaller than the range of image information of one image plane stored in the image memory 7. The reading-out range is shifted with respect to the range of image information of one image plane stored in the image memory 7 in the direction of cancelling the motion vector. With the movement of the image cancelled by the shift of the image information reading-out range, any shake of the image can be corrected. The image information for which the image shake has been corrected in this manner by the image-shake correcting circuit 8 has a smaller angle of view than the size of one image plane. Therefore, an enlarging circuit 18 is arranged to enlarge the output of the image-shake correcting circuit 8 up to the size of an original image plane. As a result, information between scanning lines or between picture elements would be virtually thinned out by the enlarging process. Therefore, an interpolating process is carried out by inferring image information between the scanning lines or between the picture elements. The result of interpolation is outputted to a VTR and/or to a monitor.

Further, the output of the motion vector detecting circuit 9 is supplied also to a gate position control circuit 17. The gate position control circuit 17 is arranged to provide the gate circuit 11 with a gate correction signal for passing only a signal corresponding to a specific area, i.e., the focus detecting area, in the image plane by on-off controlling a signal outputted from the BPF 10. The opening and closing timing of the gate circuit 11 is thus controlled by the gate correction signal. The arrangement of varying the opening and closing timing of the gate circuit 11 means that the position and the size of the focus detecting area in the image plane are varied accordingly. The gate position control circuit 17 is thus arranged to operate, on the basis of the motion vector outputted from the motion vector detecting circuit 9, to shift or move the focus detecting area in the direction of cancelling the motion vector and at a speed indicated by the motion vector.

With the embodiment arranged as described above, the positional relation between the focus detecting area and the object image is such that the object image always comes to be stabilized for every field irrespective of the presence or absence of an image shake. Therefore, the automatic focusing action is never caused to become unstable by any unexpected incoming and outgoing movement of the image of a main object of shooting or that of the background into or out of the focus detecting area. The arrangement thus enables the embodiment to accurately carry out focus adjustment without being affected by any movement of the image (image shake) of the object.

The above-stated image shake correcting process and the process of moving, or shifting, the focus detecting area according to the image-shake correcting process are described with reference to FIG. 4 as follows. In FIG. 4, reference numeral 100 denotes the whole image plane (image information) stored in the memory 7. Reference numeral 101a denotes a range of image reading which is set to be smaller than the whole image plane. The movement of an image, i.e., an image shake, can be cancelled by moving, or shifting, the readout range 101a within the image plane 100. Reference numeral 101b denotes a readout range which is shifted in the direction of the motion vector V outputted from the motion vector detecting circuit 9. Then, along with the movement of the readout range, a focus detecting area 102a is also shifted to a position as indicated by an area 102b.

The focus detecting area thus can be reliably shifted to accurately follow the movement of the object image taking place in relation to the focus detecting area in the event of occurrence of an image shake.

The high frequency component of the video signal which is taken out by the gate circuit 11 is peak-held, i.e., has its peak value held, by the the detection circuit 12 at intervals of a period of time which is an integer times as long as the period of the vertical synchronizing signal. An AF evaluating value signal is obtained by this action of the detection circuit 12. The AF evaluating value signal is inputted to the motor control circuit 13. The motor control circuit 13 which controls the motor 15 sets the motor driving direction in which the AF evaluating value signal increases. At the same time, the motor control circuit 13 also sets the motor driving speed (a focusing speed) at a high speed if the image is greatly blurred or at a low speed if the image is blurred to a small extent. The motor driver 14 drives and controls the motor 15 in the direction and at the speed set by the motor control circuit 13. The motor 15 then causes the focusing lens 1 to move along its optical axis. The automatic focusing action is thus performed in accordance with the so-called hill-climbing method.

Other actions of the first embodiment are the same as those of the conventional automatic focusing device described in the foregoing.

The first embodiment is thus arranged to make the motion vector detecting circuit 9 compute a time-series correlation between images so as to obtain a motion vector which indicates the direction and the speed of any movement of the object image taking place within the image plane. Then, an image-shake signal which indicates image-shake, on the basis of the motion vector, is obtained. The image-shake correcting circuit 8 then corrects a standard TV signal on the basis of the image-shake signal. The TV signal thus corrected is supplied to external circuits such as a VTR and a monitor. Meanwhile, the image-shake signal from the motion vector detecting circuit 9 is also supplied to the gate position control circuit 17. In accordance with the image-shake signal, the gate position control circuit 17 corrects the position of the focus detecting area to obtain the AF evaluating value signal. Therefore, any abrupt change in the AF evaluating value signal due to an image shake can be effectively prevented by this arrangement. The automatic focusing action thus can be stably carried out. Another advantage of the first embodiment lies in that, since the AF evaluating value signal is taken out without passing it through image signal processing circuits such as the memory 7, the image-shake correcting circuit 8 and the enlarging circuit 18, the deterioration of the signal is very small.

Second Embodiment

A second embodiment of this invention is next described with reference to FIG. 3 as follows:

The second embodiment differs from the automatic focusing device which has been described in the foregoing with reference to FIG. 1 in the following points. The input side of a motion vector detecting circuit 9 which detects a movement of the picked-up image taking place within the image plane by computing a time-series correlation between images is connected to the output side of the A/D converter 5. A memory 7 which stores the video signal outputted from the camera signal processing circuit 6 is connected to the output side of the camera signal processing circuit 6. The output side of the motion vector detecting circuit 9 is connected to an image-plane cutting-out circuit 19, which stabilizes the image of a main object for every field, like in the case of the first embodiment, by varying a range of cutting out a part of the image plane. The memory 7 is also connected to the image-plane cutting-out circuit 19. The output side of the image-plane cutting-out circuit 19 is connected to an enlarging circuit 18, which is arranged to enlarge the image to fill a peripheral blank part of the image plane and to carry out an interpolating process between scanning lines and between picture elements.

Further, in the case of the second embodiment, the input terminal of the BPF (band-pass filter) 10 is connected to a junction point between the image-plane cutting-out circuit 19 and the enlarging circuit 18, instead of the output side of the A/D converter 5. With the exception of these points, all other parts of the second embodiment are arranged in the same manner as the automatic focusing devices described in the foregoing with reference to FIGS. 1 and 2 and, therefore, details of them are omitted from the following description.

The second embodiment which is arranged as described above operates as follows. The motion vector detecting circuit 9 detects and computes, on the basis of a computed time-series correlation between images, a motion vector indicating the direction and the speed of movement of the object image taking place within the image plane. A signal indicating the motion vector, that is, an image-shake signal indicating a shaking state of the image within the image plane is inputted to the image-plane cutting-out circuit 19. At the image-plane cutting-out circuit 19, a cutting-out process of cutting a part of the image plane and positioning it in the middle of the image plane according to the image-shake signal is performed on a video signal read out from the memory 7. This process is carried out in such a way as to stabilize the object image for every field. As a result of the cutting-out process, a video signal is obtained with the image shake corrected. The video signal is then inputted to the enlarging circuit 18 and the BPF 10.

The enlarging circuit 18 performs, as mentioned above, the process of enlarging the object image to fill the peripheral blank part of the image plane. The video signal is converted into a standard TV signal through this enlarging process and is supplied to an external circuit or circuits. At the BPF 10, on the other hand, a high frequency component is taken out from the video signal which is obtained through the cutting-out process and the image-shake correcting action of the image-plane cutting-out circuit 19. The high frequency component of the video signal is inputted to the gate circuit 11. The gate circuit 11 then further takes out, from this input high frequency component, a high frequency component which corresponds to a focus detecting area set within the image plane. The high frequency component of the video signal taken out by the gate circuit 11 is subjected to a peak holding process performed by the detection circuit 12 at intervals synchronized with a period of time which is an integer times as long as the period of a vertical synchronizing signal. An AF evaluating value signal is thus obtained.

The AF evaluating value signal is inputted to the motor control circuit 13. The motor control circuit 13 sets the motor driving direction in which the AF evaluating value signal increases. At the same time, the motor control circuit 13 also sets, according to the state of focus, the motor driving speed (focusing speed) at a high speed if the image is greatly blurred and at a low speed if the image is not much blurred. The motor driver 14 then drives and controls the motor 15 in the direction and at the speed set by the motor control circuit 13. The motor 15 causes the focusing lens 1 to move along its optical axis in such a way as to carry out an automatic focusing action according to the so-called hill-climbing method.

In the second embodiment, the image-plane cutting-out circuit 19 is thus arranged to cut out a part of the image plane, on the basis of the image-shake signal from the motion vector detecting circuit 9, and to set the cut-out part in the middle of the image plane in such a way as to stabilize the object image for every field. The enlarging circuit 18 performs an enlarging process on the video signal obtained by the cutting-out process in such a way as to fill the peripheral blank part of the object image on the image plane. A standard TV signal thus obtained is supplied to an external circuit or circuits. Meanwhile, the AF evaluating value signal is obtained from the video signal. Therefore, the AF evaluating value signal thus obtained is effectively prevented from being abruptly changed by any image shake, so that the automatic focusing action can be stably carried out. Further, the arrangement of the embodiment obviates the necessity of controlling the gate circuit 11 according to the motion vector obtained by the motion vector detecting circuit 9. Therefore, the embodiment can be simply arranged.

As described in the foregoing, in the first embodiment of this invention, the gate means takes out a signal corresponding to the focus detecting area in the image plane from the signal extracted by the filter means. Then, on the basis of a detection output of the motion vector detecting circuit, the position of the focus detecting area the signal of which is taken out by the gate means is corrected in such a way as to stabilize the object image for every field. The driving means then drives the focusing lens to an in-focus position on the basis of an output of the gate means. Therefore, the automatic focusing action can be stably carried out without being affected by an image shake resulting from hunting, a stray movement, or the like under any shooting condition. The lens thus can be stably focused on the object of shooting.

Further, according to the arrangement of the second embodiment, the signal corresponding to a part of the image plane is cut out from the picked-up image signal by the image-plane cutting-out means on the basis of a detection output of the motion vector detecting circuit. The position of the cut-out image plane part is adjusted in such a way as to stabilize the object image. Then, from the video signal which is corrected in this manner, a signal portion corresponding to the set focus detecting area is extracted by the filter means. The focusing lens is then driven to an in-focus position according to the signal portion corresponding to the set focus detecting area, so that the same advantageous effect as that of the first embodiment can be attained also by the arrangement of the second embodiment.

What is claimed is:

1. An automatic focusing device comprising:

image storing means for storing an image signal outputted from image pickup means;

motion vector detecting means for detecting from image signals a movement of an image and outputting a motion vector;

extracting means for extracting a predetermined frequency component signal from the image signals in a focus detecting area as a focus evaluating signal; and control means for controlling said extracting means and said image storing means to simultaneously and synchronously shift a read-out region for reading out the image signal from said image storing means and the focus detecting area different from the readout region in response to a common motion vector detected by said motion vector detecting means.

2. A device according to claim 1, wherein said motion vector detecting means is arranged to detect an amount of movement of an image and a direction of the movement of the image by comparing images obtained on a plurality of field image planes and computing a correlation between the images of the field image planes.

3. A device according to claim 1, wherein said control means is arranged to control said shifting in such a manner as to move the focus detecting area in a direction in which said motion vector detected by said motion vector detecting means becomes zero.

4. A device according to claim 1, wherein said extracting means is arranged to extract a high frequency component included in the image signals.

5. A device according to claim 1, further comprising movement correcting means for correcting the movement of the image on the basis of an output of said motion vector detecting means.

6. A device according to claim 5, wherein said image storing means includes an image memory arranged to store the image signals for one picture, and means for varying a range of reading out an image from said image memory in the direction of said motion vector outputted from said motion vector detecting means.

7. An automatic focusing device comprising:

storing means for storing an image signal outputted from image pickup means;

motion vector detecting means for detecting from the image signal a movement of an image and outputting a motion vector corresponding to the movement;

image cutting-out means for electronically shifting a range of cutting out the image signal stored in the storing means on the basis of a detection output of said motion vector detecting means in such a way as to cancel the movement of the image and stabilize the image of an object formed on an image sensing plane;

filter means for extracting a signal of a predetermined frequency component from an output signal read out from said storing means by said image cutting-out means and had been corrected the movement of the image;

gate means for taking out from the signal extracted by said filter means a signal corresponding to a focus detecting area different from the range of said motion vector detecting means and shifted on the basis of the detection output of said motion vector detecting means; and driving means for driving a focusing lens to move to an in-focus position on the basis of an output of said gate means.

8. A device according to claim 7, wherein said notion vector detecting means is arranged to detect an amount of movement of the image and a direction of the movement of the image by comparing images obtained On a plurality of field image planes and computing a correlation between the images of the field image planes.

9. A device according to claim 8, wherein said image cutting-out means is arranged to shift a position in the image signal where the image sensing plane is to be cut out, in such a way as to cause said motion vector detected by said motion vector detecting means to become zero.

10. A device according to claim 7, wherein said filter means is arranged to extract a high frequency component included in the image signal.

11. A device according to claim 7, further comprising enlarging means for enlarging the image signal outputted from said image cutting-out means.

12. A device according to claim 11, wherein said filter means is connected to a junction point between said image cutting-out means and said enlarging means.

13. A video camera comprising:

a) image pickup means arranged to output a picked-up image signal;

b) memory means for storing the image signal;

c) area setting means for setting a focus detecting area in an image plane;

d) motion detecting means for detecting an image shake by detecting movement of an image on said image plane; and e) control means for controlling said memory means and said area setting means to simultaneously and synchronously shift said focus detecting area and a read-out area different from the focus detecting area for reading out the image signal from said memory means on the basis of a common output of said motion detecting means.

14. A video camera according to claim 13, wherein said motion detecting means is arranged to detect a motion vector from the picked-up image signal.

15. A video camera according to claim 14, wherein said control means is arranged to control the position of the focus detecting area in such a way as to cause the motion vector to become zero.

* * * * *

UNITED STATES PATENT AND TRADEMARK OFFICE
CERTIFICATE OF CORRECTION

PATENT NO.    : 6,556,246 B1
DATED         : April 29, 2003
INVENTOR(S)   : Hirofumi Suda It is certified that error appears in the above-identified patent and that said Letters Patent is hereby corrected as shown below:

Column 5,
Line 22, delete "follows:" and insert -- follows. --.

Column 8,
Line 15, delete "notion" and insert -- motion --.

Column 10,
Line 17, delete "On" and insert -- on --.

Signed and Sealed this

Twenty-first Day of October, 2003

JAMES E. ROGAN
*Director of the United States Patent and Trademark Office*